(12) United States Patent
Pelisster et al.

(10) Patent No.: US 6,654,369 B1
(45) Date of Patent: *Nov. 25, 2003

(54) METHOD FOR DIRECTING THE ROUTE OF A CELL TRANSMITTING A NETWORK

(75) Inventors: Joseph E. Pelisster, Hillsboro, OR (US); William H. Swortwood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/322,152

(22) Filed: May 28, 1999

(51) Int. Cl.⁷ ............................................... H04L 12/28
(52) U.S. Cl. ....................................... 370/389; 370/351
(58) Field of Search ................................. 370/389, 351, 370/392, 395–3, 401, 428

(56) References Cited

U.S. PATENT DOCUMENTS

| | | | |
|---|---|---|---|
| 5,280,480 A | * | 1/1994 | Pitt et al. |
| 5,282,201 A | | 1/1994 | Frank et al. |
| 5,327,431 A | * | 7/1994 | Heske, III et al. |
| 5,422,878 A | | 6/1995 | Kimoto et al. |
| 5,432,907 A | | 7/1995 | Picazo et al. |
| 5,504,742 A | | 4/1996 | Kakuma et al. |
| 5,541,911 A | | 7/1996 | Nilakantan et al. |
| 5,566,170 A | * | 10/1996 | Bakke et al. |
| 5,649,108 A | * | 7/1997 | Spiegel et al. |
| 5,802,042 A | | 9/1998 | Natarajan et al. |
| 5,859,846 A | | 1/1999 | Kim et al. |
| 6,119,171 A | * | 9/2000 | Alkhatib |
| 6,356,563 B1 | * | 3/2002 | Nicoll et al. |

* cited by examiner

*Primary Examiner*—Kenneth Vanderpuye
(74) *Attorney, Agent, or Firm*—Kenyon & Kenyon

(57) ABSTRACT

A method for routing a cell through a network using explicit routing or destination routing, or a combination of both routing techniques. A directed route for a cell can include an explicit route portion and a destination address routing portion. An address in the cell can indicate the technique that should be used to route the cell. Explicit routing is used if the address is equal to a predetermined global address or an address of the device and the cell has not reached the end of the explicit route. Otherwise, destination address routing is used based on a final destination address.

26 Claims, 5 Drawing Sheets

FIG. 3

|  | OUTBOUND, NOT AT END OF EXPLICIT ROUTE | INBOUND, NOT AT END OF EXPLICIT ROUTE | OUTBOUND AT END OF EXPLICIT ROUTE[4] | INBOUND AT END OF EXPLICIT ROUTE[5] |
|---|---|---|---|---|
| DA | PERMISSIVE | PERMISSIVE | DMAC | SMAC |
| SA[1] | CURRENT DEVICE'S ADDRESS | CURRENT DEVICE'S ADDRESS | CURRENT DEVICE'S ADDRESS | CURRENT DEVICE'S ADDRESS |
| HOP POINTER | INCREMENT | DECREMENT | NO CHANGE | NO CHANGE |
| RPATH( ) | IF HOP POINTER $\geq$ 1, RPATH (HOP POINTER) IS SET TO PORT NUMBER CELL WAS RECEIVED ON.[2] | NO CHANGE | RPATH (HOP POINTER) IS SET TO PORT NUMBER CELL WAS RECEIVED ON | NO CHANGE |
| FORWARD TO | IPATH (HOP POINTER) | RPATH (HOP POINTER) | IF DMAC IS CURRENT DEVICE'S ADDRESS, THEN DON'T FORWARD.[3] OTHERWISE, FORWARD BASED ON DA AND FORWARDING DATABASE | IF SMAC IS CURRENT DEVICE'S ADDRESS, THEN DON'T FORWARD.[3] OTHERWISE, FORWARD BASED ON DA AND FORWARDING DATABASE |

NOTES:

1. IF AN ADDRESS HAS NOT BEEN ASSIGNED, USE THE PERMISSIVE DESTINATION ADDRESS.
2. HOP POINTER REFERS TO THE VALUE OF HOP POINTER BEFORE IT IS INCREMENTED.
3. IN THIS CASE THE CELL HAS REACHED ITS FINAL DESTINATION, I.E., THERE IS NO SUBSEQUENT ROUTING OF THE CELL REQUIRED.
4. END OF EXPLICIT ROUTE PORTION IS INDICATED BY HOP POINTER $\geq$ HOP COUNT.
5. END OF EXPLICIT ROUTE PORTION IS INDICATED BY HOP POINTER = 0.

METHOD FOR DIRECTING THE ROUTE OF A CELL TRANSMITTING A NETWORK

FIELD

The invention generally relates to data networks and in particular to a method for directing the route of a cell transiting a network.

BACKGROUND

In computer networks, data cells are generally routed using one of two methods. The first method involves the insertion of a "destination address" in the cell. Each switch or device within the network contains a forwarding database (also known as a routing table). This forwarding database contains an entry for each known destination address along with information related to how the cell is to be routed. The forwarding database usually lists an output port corresponding to each known destination address. This method requires that the forwarding database be configured before cells can transit the network. This configuration may be accomplished by a central configuration device or by various algorithms that permit each of the devices, with the cooperation of adjoining devices, to learn routes throughout the network.

The second method is explicit routing. In this method, the entire route that a cell is to transverse is explicitly stated within the cell. Each switch or device forwards the cell based on the information within the cell. Consequently, the devices within the network are not required to maintain forwarding databases.

A major limitation of destination address routing is the requirement of each device within the network to contain a configured-forwarding database before data communication can take place. To achieve this, complex algorithms are required that allow each device to learn the topology of the network and to make appropriate forwarding database entries. Alternatively, a central device can configure the network; however, this is complicated by the fact that methods must be provided for the central device to learn the topology of the network without the network functioning. A second limitation is additional network complexity (redundancy) to provide network fault tolerance. Many networks are configured with multiple paths between points on the network. In this way, if a link fails, cells may be routed along alternate paths maintaining communication in the presence of the fault. With destination address routing, complex algorithms must be provided to detect such faults, and to determine alternate routes around the faults. The time required to perform these functions, referred to as network convergence time, may be unacceptably long for certain applications.

Explicit routing eliminates the need to configure devices within a network to enable communication. However, explicit routing requires significantly increased processing by the communicating devices. This is due to the fact that an originating device must maintain information regarding the entire route between itself and the final destination. Furthermore, network efficiency is reduced since the entire route must be carried along with the cell. And finally, network performance may be reduced since the intervening devices must examine more data within the cell before a forwarding decision can be made.

Therefore, a need exists for a more flexible technique for routing cells through a network which provides the advantages of both the destination address routing and explicit routing techniques.

SUMMARY

According to an embodiment of the present invention, a method of routing a cell along a directed route is provided. A cell is received, and includes a first address and a final destination address. The cell is explicitly routed if the first address is a predetermined global address or the address of the device. The cell is destination address routed if the first address is not equal to the predetermined global address or the address of the device.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 3 is a table illustrating the processing of directed route fields during the explicit route processing according to an example embodiment of the present invention.

DETAILED DESCRIPTION

The arrangement of directed routing of the present invention allows a cell to be routed through a network using explicit routing or destination routing, or a combination of both routing techniques. A directed route for a cell that is transiting a network can include a first portion of the directed route that uses a first routing technique and a second portion of the directed route that uses a second routing technique. For example, a directed route can include an explicit route followed by a destination address route, or the directed route can include a destination address route followed by an explicit route. The directed route can also include more than two route portions.

According to an embodiment of the present invention, a cell (e.g., including a cell header) may include several variables or fields that are used for the directed routing through the network. These fields include a destination address (DA) that is used to specify either destination address routing or explicit routing. Other fields in the directed route cell include a Direction field, which is set to 0 for outbound cells and set to 1 for inbound cells. In general, outbound cells are initially generated cells. Inbound cells are cells that are generated in response to outbound cells that typically follow the reverse explicit path through the network. The fields in the directed route cell can also include a list of ports in IPath( ) defining an outbound explicit route. A list of explicit ports RPath( ) defining a return or inbound explicit path or route is populated or generated by devices (e.g., switches) along the outbound explicit route.

The address in the DA field may be either a specific address of a target or destination device (indicating that the cell should be destination address routed) or a permissive destination address (indicating that the cell should be explicitly routed). The permissive address is a predetermined global address that is interpreted by devices in the network as being explicitly addressed to it.

When a cell is received at a switch, the address in the DA field is provided to the device's forwarding database. The database returns a port number corresponding to the address. If the address in the DA field is the address of another device in the network, the cell is destination address routed by sending the cell out the port returned by the forwarding database. If the address is the permissive address or matches the address of the switch itself, the cell is provided to the switch's management entity for explicit route processing. In explicit route processing, the management entity examines several variables and may forward the cell to the next hop of an explicit route or may reset the DA field to a final destination address (indicating destination address routing should be used) if the cell is at the end of an explicit route that is followed by a destination address route.

Figure 1:
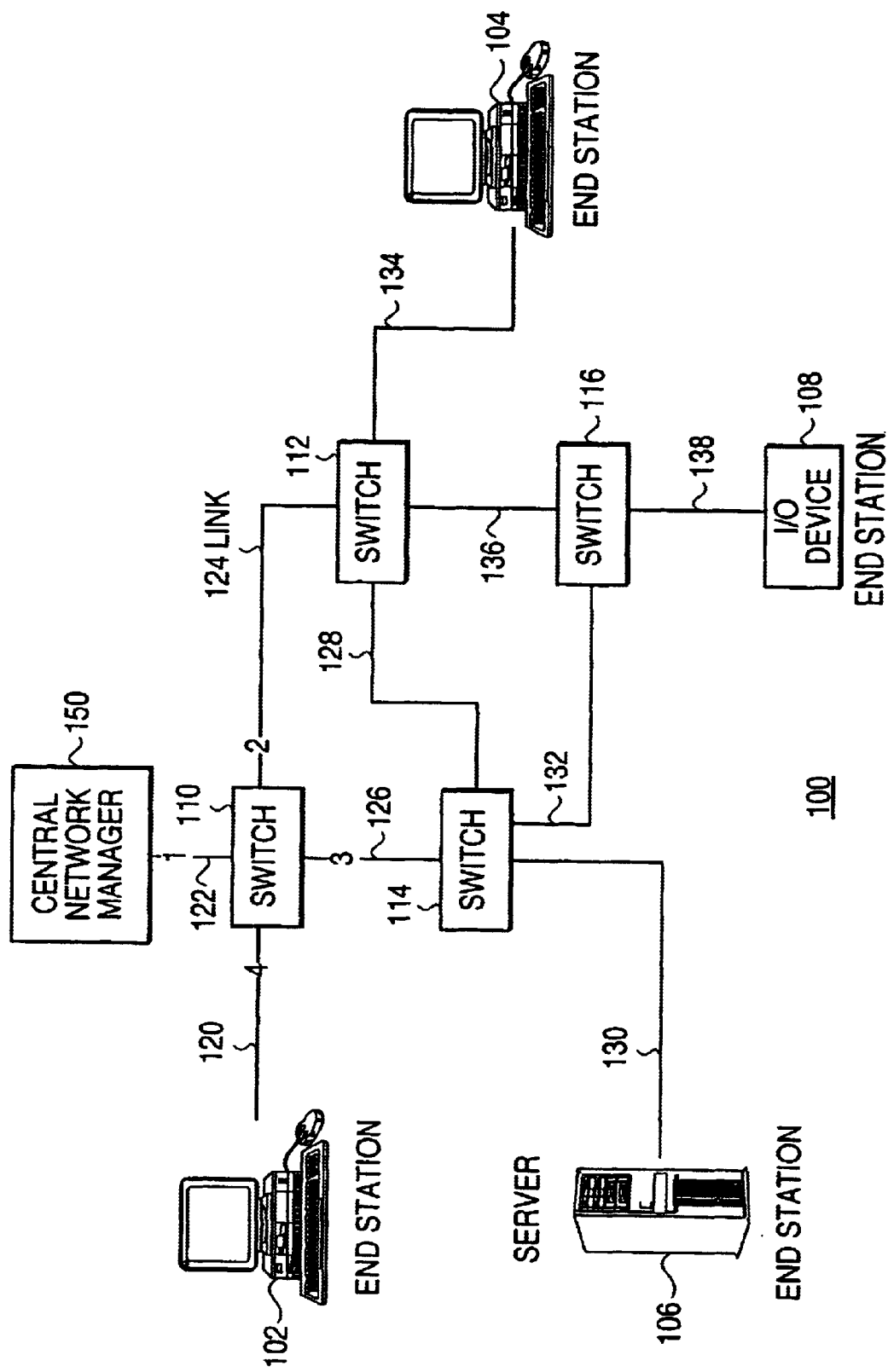
FIG. 1 is a block diagram illustrating a network according to an example embodiment of the present invention.

Referring to the figures in which like numerals indicate like elements, FIG. 1 is a block diagram illustrating a network according to an embodiment of the present invention. Network 100 may be a system area network (SAN), local area network (LAN), or other data network or packet switched network. Network 100 includes several end stations including computers 102 and 104, a server 106 and an input/output (I/O) device 108, which may be a hard disk drive, a tape drive, a CD ROM, etc. The end stations provided in the network 100 can be a wide variety of computers, servers, I/O devices or other devices. The specific end stations shown in FIG. 1 are provided only as examples.

The network 100 also includes a plurality of switches. The various switches and end stations are interconnected via links. A link is a bidirectional communication path between two connect points (e.g., switches or end stations) in the network 100. Each switch includes one or more ports each connected to an end point of a link. For example, switch 110 includes ports 1, 2, 3 and 4 which are numbered in FIG. 1. The switches relay or forward cells between the links using explicit routing and/or destination address routing.

Switch 110 is connected to end station 102, switch 114 and switch 112 via links 120, 126 and 124, respectively. Switch 114 is also connected to end station 106, switch 116 and switch 112 via links 130, 132 and 128, respectively. Switch 112 is also connected to switch 116 and end station 104 via links 136 and 134. Switch 116 is also connected to end station 108 via link 138. The specific number and configuration of end stations, switches and links of FIG. 1 is provided simply as an example network according to an embodiment of the present invention. Network 100 may include any number of end stations, switches and links.

An optional central network manager 150 is connected to switch 110 via link 122 for learning the network topology and calculating the forwarding databases for each switch, initializing or configuring each of the switches including loading or assigning their MAC addresses and loading their forwarding databases, detecting and managing faults or link failures in the network and performing other network management functions. Central network manager 150 could be provided as a separate device that is connected to one or more switches, could be included in a switch or could a be a software application that runs on one of the computers or end stations. Alternatively, one or more of these management functions can be performed in a distributed manner by a plurality (or all) of the switches, but this would require each switch to include greater processing capacity. For example, rather than having a central network manager 150 calculate and download forwarding databases for each switch, each switch can separately learn the topology of the network and generate its own forwarding database.

Figure 2:
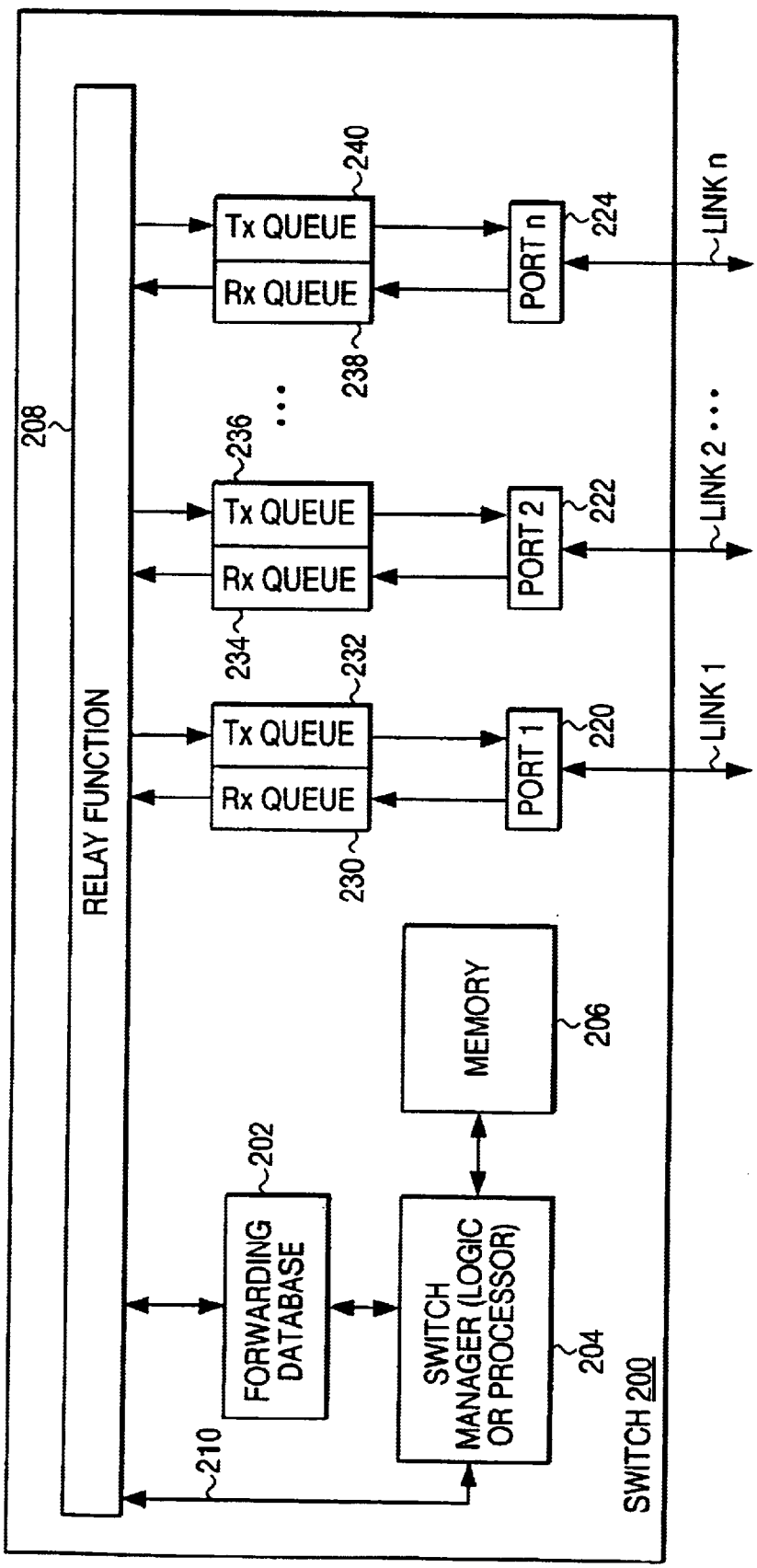
FIG. 2 is a block diagram illustrating a switch according to an example embodiment of the present invention.

FIG. 2 is a block diagram illustrating a switch according to an embodiment of the present invention. Switch 200 includes a switch manager 204 (which may be logic or a processor) for managing certain functions of the switch 200, a memory 206 connected to the switch manager 204 and a forwarding database 202 (also known as a routing table). A relay function 208 is also provided for relaying received cells to specific destination ports. Switch 200 also includes a plurality of ports, including ports 1-n (shown as ports 220, 222 and 224 in FIG. 2). Receive (Rx) and transmit (Tx) queues are connected between the relay function 208 and each port. Rx queue 230 and Tx queue 232 are connected to port 1, Rx queue 234 and Tx queue 236 are connected to port 222, and Rx queue 238 and Tx queue 240 are connected to port n.

Switch manager 204 communicates (e.g., via the network or any other channel) with central network manager 150 (FIG. 1) to receive information for switch initialization (e.g., to receive the switch address) and to receive and download the forwarding database. Switch manager 204 also controls the forwarding or relaying of cells during the explicit route of the directed route. Each switch also includes its own unique forwarding database 202. The forwarding database 202 indicates a destination port for each destination address (e.g., network address or Medium Access Control or "MAC" address) and is used to forward cells using destination address routing. Each switch includes its own unique address. According to an example embodiment, the switch address is actually the address that identifies the switch manager 204.

Directed Routing

Directed routing provides a hybrid method of specifying the route of a cell that addresses the limitations stated above. A directed routed cell may be routed using destination address routing, explicit routing, or a combination of the two.

The destination address routing may be used for the majority of the cells once the network has been configured and is operational. In this way, the communicating devices are freed from the tasks of maintaining routes. Furthermore, cells transition the network more efficiently since forwarding decisions may be made after examining only a small portion of the cell, i.e., the destination address.

A explicit routing mechanism is provided for network configuration, initialization (e.g., assigning network addresses to switches or devices) or re-initialization, fault detection or other circumstances. This greatly simplifies the determination of network topology within a network whose forwarding databases have not been configured or when the databases are in an unknown state. Explicit routing can be used by the central network manager 150 to forward management cells throughout an unconfigured or partially unconfigured network 100. A mechanism is also provided to easily generate a return route. Thus, other devices in the network can easily generate return messages to the central network manager 150.

The two methods can be combined to provide efficient means of detecting faults in the network, of detecting topology changes, and to make appropriate changes to the forwarding databases as a result. For example, a central network controller or device can send management cells through various explicit routes through the network back to itself, and can identify failed links based on which cells returned successfully. As a further example, using the hybrid approach, a cell may be routed using the destination address and the forwarding databases to a particular point in the network. Then an explicit partial route within the cell is followed to a second point in the network. Finally, the cell is once again routed based on a new destination address from the second point to its final destination.

According to an embodiment of the present invention, there are two components that support the directed routing mechanism: the permissive destination address and the explicit route. The permissive destination address is simply a predetermined global address that is recognized by all (or at least many) devices in the network as indicating that the cell is to be processed as if it was explicitly addressed to the device. The explicit route is an explicit list of port numbers that a cell is to traverse during the explicit phase of its transition through the network.

Frequently, explicit routing is only required though a small portion of the network, or only under certain circumstances (e.g., to assign a network address to a specific switch). Therefore, the directed routing algorithm provides a method to utilize destination routing on either side of the explicit route, as an example. There are many sub-classes of directed routes, for example:

Explicitly routed from source device to destination device.

Destination address routed from source device to intervening device. Explicitly routed from intervening device to destination device Explicitly routed from source device to intervening device. Destination address routed from intervening device to destination device.

Destination address routed from source device to intervening device. Explicitly routed from intervening device to second intervening device. Destination address routed from second intervening device to destination.

According to an embodiment of the present invention, directed routing can use several variables that are carried in the cell (e.g., carried in the cell header). These are defined as follows:

DA (destination address): This is initialized to the destination address of the first device in the explicit route portion of the directed route. If the first device encountered is to start the directed route portion (i.e. there is no initial destination routing portion), then this may be set to the permissive destination address. During the explicit route portion of the directed route, this is set to the permissive destination address. During the final destination address route portion of the directed route, if it exists, this is set to the address of the final destination.

SA (source address): This is initialized to the address of the device initiating a cell. It is updated with the address of any device forwarding the cell along the explicit route portion of a directed route.

Direction: Set to 0 for outbound cells. Set to 1 for inbound cells. In general, outbound cells are initially generated cells. Inbound cells are cells that are generated in response to outbound cells that must follow the reverse path through the network.

Hop Pointer: Identifies current hop in the cell's explicit route. Initialized to 1 for outbound cells or initialized to Hop Count for inbound cells. If Direction=0, incremented by 1 by each device forwarding the cell along the explicit route. If Direction=1, decremented by 1 by each device forwarding the cell along the explicit route.

Hop Count: Number of hops in the explicit path.

SMAC (Network or MAC source address): The address of the originating device of the cell.

DMAC (Network or MAC final destination address): The address of the final destination of the cell.

IPath( ): A list of ports defining the outbound explicit route. The number of entries in this list is Hop Count.

RPath( ): Return path. A list of ports defining the inbound explicit path. Used to direct the cell when Direction=1.

When Direction=0, an entry is made by each forwarding device along the explicit outbound path indicating the port on which the cell was received.

It Overall Operation of a Switch

The overall operation of a switch according to an embodiment of the present invention will be briefly described. Referring to FIG. 2, when a device (e.g., switch) receives a cell over a link, the cell is received through a port and is temporarily stored in a Rx queue. The relay function 208 copies the destination address in the DA field and forwards it to the forwarding database 202. The forwarding database 202 returns a destination port corresponding to the address in the DA field. The address in DA is typically either an address of a device (either this device or another device) or the permissive address. The permissive address is a predetermined global address that is interpreted by devices in the network as being explicitly addressed to it (e.g., as being addressed to its switch manager 204).

If the address in the DA field is the permissive address (or the actual address of the switch itself), then the forwarding database 202 will return the port pre-assigned to the switch manager 204 because the permissive address is interpreted by each switch as being specifically addressed to its switch manager 204. The relay function 208 then relays the cell to memory 206 for processing by the switch manager 204 if the destination address in the DA field is the Permissive address or if the port number returned from the database 202 matches the port number pre-assigned to the switch manager 204. The switch manager 204 then processes the cell to forward or relay the cell using explicit routing if the cell is not at the end of an explicit route, as described in detail below in connection with FIG. 3.

Otherwise, if the destination address in the DA field of the cell is not the permissive address (or is not the address of the switch itself), the relay function 204 transfers the cell into the Tx queue of the port number specified by the forwarding database 202. The cell is then forwarded out to a link via the corresponding port identified by the forwarding database (i.e., forwarded based on destination address routing). As a result, a cell can transit a network using one or both of destination address routing and explicit routing, depending on the address provided in the DA field and other variables in the cell.

Initiating a Directed Route Cell

To initiate a directed route cell, the initiating device must initialize the directed route variables.

The Direction field is set to zero. This specifies that the cell is outbound.

DA is set to the address of the first device in the route that is to execute the directed route algorithm. The initiator must ensure that the forwarding databases are sufficiently loaded in all devices between itself and the beginning of the directed route to deliver the cell. Furthermore, if a response or return cell is expected, the reverse route must also be loaded by the time the initial cell reaches its final destination. If the directed route is to commence at the first device encountered, then the DA is loaded with the permissive destination address.

SA is set to the address of the cell initiator. If an address has not been assigned, then it is set to the permissive destination address.

Hop Pointer is set to 1.

Hop Count is set to the number of hops in the explicit route portion.

SMAC is set to the address of the cell initiator. If an address has not been assigned, then it is set to the permissive destination address.

DMAC is set to the address of the final destination of the cell. If an address has not bee n assigned, then it is set to the permissive address. Also, if the final destination is at the end of the explicit route (i.e. there are no subsequent switched segments in the route), then DMAC may be set to either the address of the final destination or to the permissive destination address. Again, if there are destination address routed segments subsequent to the explicit route portion, then forwarding database entries appropriate to the route must be loaded in intervening devices and an address must be assigned to the destination.

IPATH( ) is an array containing Hop Count entries. It is initialized to the port number to which the cell is to be forwarded for each device in the explicit path or route.

RPATH( ) is an array of Hop Count entries used to contain the explicit return path. It is initialized to all zeros.

Directed Route Return Cell Initialization

Frequently, a device will need to return a cell in response to receiving one. The directed routing mechanism provides a straightforward mechanism for accomplishing this. As the cell traverses the network outbound, an additional array, RPATH( ), is populated by each switch along the explicit route. Each switch along the explicit route inserts the port number from which the cell was received into RPath( ). As a result, a return route (e.g., to the central network manager 150, FIG. 1) is established.

Several fields are re-initialized prior to returning a cell along the return route. The Direction field is set to one. This specifies the inbound path. Hop Count, SMAC, DMAC, IPath( ), and RPath( ) are copied from the initial cell into the return cell. The Hop Pointer is set to Hop Count.

In general, the DA field in the return cell header is set to the SA from the initial cell header. The SA in the return cell header is set to the DA field in the initial cell header (i.e., DA and SA are simply swapped from the initial cell header to the return cell header). The return cell is then forwarded out the port from which the initial cell was received.

Explicit Route Processing

Explicit route processing according to an example embodiment of the present invention will now be described. Explicit route processing is performed (e.g., by the switch manager 204, FIG. 2) if the address in the DA field of the cell is either the permissive address (or predetermined global address) or matches the specific address of the device. Otherwise, if the address in the DA field does not match the device's address or the permissive address, explicit route processing is not performed and the cell is routed using destination address routing based on the address in the DA field and the device's forwarding database.

Pseudo code of the explicit route processing is given below for an example embodiment of the present invention:

```
If Direction = 0 and Hop Pointer < Hop Count Then
    DA ← permissive address
    If device address is assigned Then
        SA ← device address
    Else
        SA ← permissive address
    End If
    If Hop Pointer ≥ 1 Then
        RPath(Hop Pointer) ← port number cell received on
    End If
    Hop Pointer ← Hop Pointer + 1
    Forward cell to port IPath(Hop Pointer - 1)
Else If Direction = 0 and Hop Pointer ≥ Hop Count
```

-continued

```
    DA ← DMAC
    If device address is assigned Then
        SA ← device address
    Else
        SA ← permissive address
    End If
    RPath(Hop Pointer) ← port number cell received on
    If DMAC ≠ device address Then
        forward cell to port based on DA
    End If
Else If Direction = 1 and Hop Pointer ≥ 1 Then
    DA ← permissive address
    If device address is assigned Then
        SA ← device address
    Else
        SA ← permissive address
    End If
    Hop Pointer ← Hop Pointer - 1
    Forward cell to port RPath(Hop Pointer + 1)
Else If Direction = 1 and Hop Pointer = 0 Then
    DA ← SMAC
    If device address is assigned Then
        SA ← device address
    Else
        SA ← permissive address
    End If
    If SMAC ≠ device address Then
        forward cell to port based on DA
    End If
End If
```

As can be seen from the pseudo code above, the processing required for each management entity along an explicit route portion of a directed route depends on two things: whether the cell is inbound or outbound, and whether the cell is at the end of the explicit route portion.

Referring to the pseudo code, when a cell is received at the management entity, the management entity (e.g., switch manager 204) first examines the Direction field and the Hop Pointer. A Direction=0 indicates an outbound cell, while a Direction=1 indicates an inbound (or return or reply) cell. IPath( ) contains the port numbers specifying the explicit outbound path, while RPath( ) contains the port numbers for the explicit inbound path. The Hop Pointer is compared to the Hop Count to determine if the cell has reached the end of the explicit route portion of the directed path.

If the cell is outbound and has not reached the end of the explicit path (Hop Pointer is less than Hop Count), the permissive address is stored in the DA field, and the SA field is updated with the address of the current device (if the address of the current device is unknown, then the permissive address is used for SA). If the Hop Pointer is greater than or equal to 1, then the port number on which the cell was received is stored in RPATH(Hop Pointer). The Hop Pointer is then incremented to two and then the cell is forwarded using explicit route processing to port IPath(Hop Pointer).

If the cell is outbound and has reached the end of the explicit route portion of the directed route (Hop Pointer is greater than or equal to Hop Count), the final destination address DMAC is stored in the DA address field, and the SA field is loaded with the address of the current device if known (otherwise, permissive address is used for SA). Then, the port number on which the cell was received is stored in RPath(Hop Pointer). If the final destination address DMAC does not match the address of the device, the cell is then forwarded using destination address routing based on the final destination address (which is stored in DA). Otherwise, if there is a match between DMAC and the device's address, the cell has reached its final destination and is not forwarded.

If the cell is inbound (Direction=1) and the cell is not at the end of the explicit path (Hop Pointer is greater than or equal to 1), then the permissive address is copied to the DA field and the current device's address (if known) is copied to SA (otherwise the permissive address is copied to SA). The Hop Pointer is decremented and the cell is then forwarded using explicit routing to port RPATH(Hop Pointer+1).

If the cell is inbound and the cell is at the end of the explicit path (Hop Pointer=0), then the address in SMAC is copied to DA and the address of the current device is copied to SA (if known, otherwise the permissive address is used for SA). If SMAC (indicating the final destination of the inbound cell) is equal to the address of the current device, this indicates that the cell has reached its final destination. If SMAC is not equal to the address of the current device, the cell is then forwarded using destination address routing based on the address stored in DA (SMAC was just copied into DA). A match between SMAC and the device's address indicates that the return cell has reached its final destination and is not forwarded.

FIG. 3 is a table which summarizes the processing of some directed route fields during the explicit route processing. During the explicit route processing, the Direction, Hop Count, SMAC, DMAC, and IPATH fields are not changed.

Referring to the first column of FIG. 3, for outbound cells (cells that are initially generated, e.g., management cells from the manager 150) and where the receiving switch is not at the end of the explicit route, DA in the cell is set (or maintained) as the permissive address and SA is set to the current device's network address (e.g., MAC address). Also the RPATH( Hop Pointer) is set to the port number on which the cell was received (prior to incrementing Hop Pointer) if Hop Pointer is greater than or equal to 1. The Hop Pointer is then incremented (because this is an outbound cell), and the cell is then forwarded to the port specified by IPATH (Hop Pointer) based on the incremented Hop Pointer.

As shown in the third column of FIG. 3, if the switch which receives the outbound cell is the last switch of the explicit route (the end of the explicit route), DA in the cell is set to DMAC (the final destination address), SA is set to the current device's network address (if known), the RPATH (Hop Pointer), is set to the port number of the switch on which the cell was received. The Hop Pointer is not incremented. If the DMAC matches this device's network address, then the cell has reached its final destination and is not forwarded. Otherwise, if the DMAC does not match the device's address, the cell is forwarded by the relay function 208 (FIG. 2) using destination address routing based on DA in the cell (which has been set to DMAC) and the forwarding database 202 (FIG. 2) of the switch.

Referring to column 2 of FIG. 3, if the received cell is an inbound cell (a cell generated in response to another cell) and the switch is not at the end of the explicit route (end of the explicit route is indicated by Hop Pointer=0), DA is set or maintained as the permissive address (indicating that the cell should continue to be explicitly routed using RPATH), SA is set to the current device's network address, the Hop Pointer is decremented, and the cell is forwarded to the destination port specified by RPATH(Hop Pointer+1), which corresponds to the port specified by RPATH prior to decrementing Hop Pointer.

Referring to column 4 of FIG. 3, if the received cell is inbound and received at a switch that is at the end of an explicit route (Hop Pointer=0), DA is set to SMAC so that the cell will be destination routed from the switch by the relay function 208 based on the address SMAC of the device or end station that generated the original cell. SA is set to the current device's address (if known, otherwise the permissive address is used). If SMAC is the current device's network address, then the cell has reached its final destination and the cell is not forwarded. Otherwise, if SMAC does not match the current device's network address the cell is forwarded by the relay function 208 (FIG. 2) of the switch using destination address routing based on DA (which has been set to SMAC) and the forwarding database 202 of the switch.

DIRECTED ROUTE EXAMPLES

Figure 4:
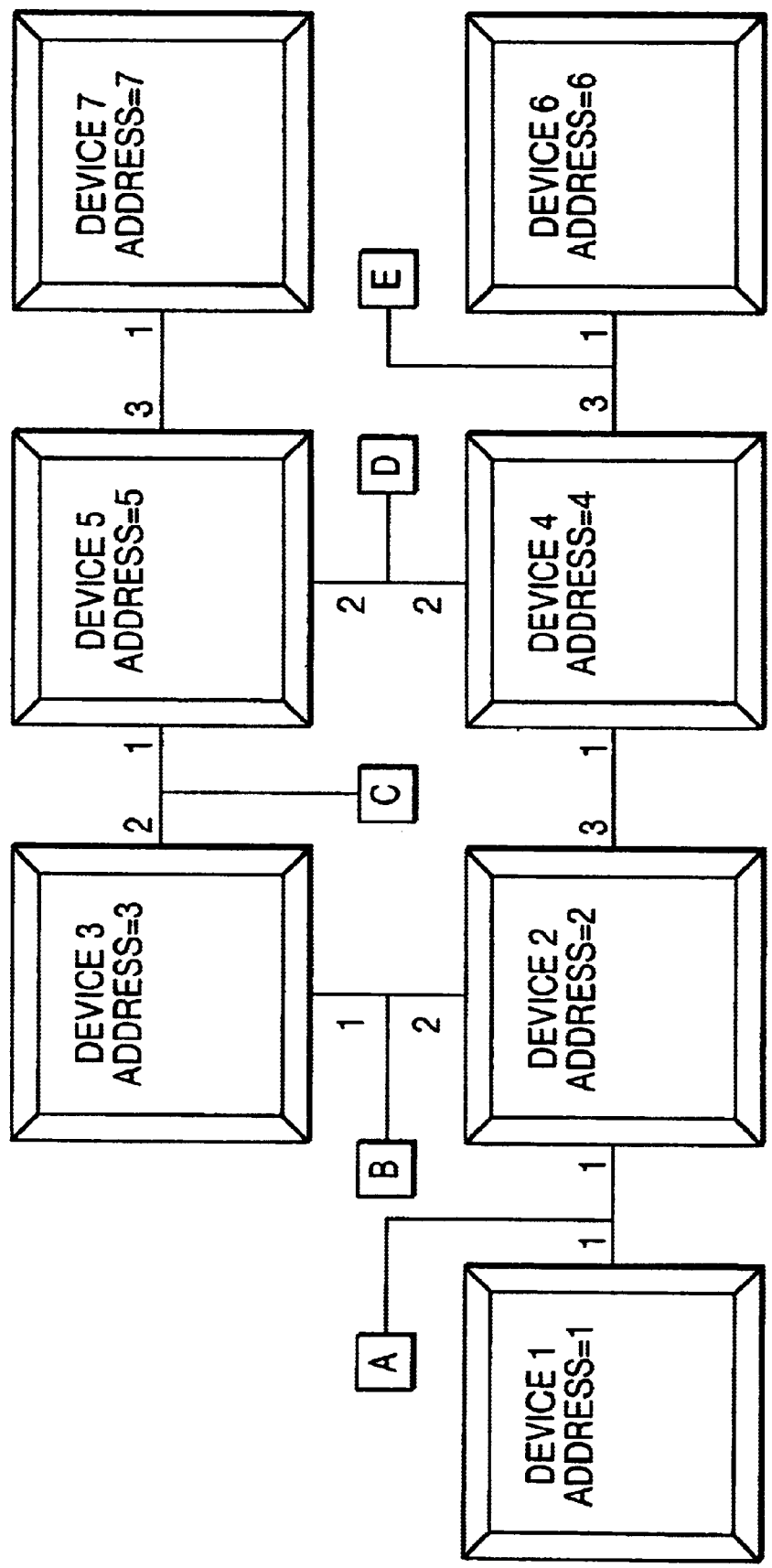
FIG. 4 is a block diagram illustrating a network according to an example embodiment of the present invention.

This section provides examples of the contents of each of the directed route variables for each hop of a cell. FIG. 4 is a block diagram illustrating an example network according to an embodiment of the present invention. Each box in FIG. 4 represents a device (e.g., either an end station or a switch) on a network with an assigned address as indicated. As shown in FIG. 4, device 1 has an address=1, device 2 has an address=2, device 3 has an address=3, device 4 has an address=4, device 5 has an address=5, device 6 has an address=6 and device 7 has an address=7.

Many of the device's are connected via links. The numbers next to each device and link refer to the device port number to which the link is attached. Individual links of interest for the examples are labeled A, B, C, D and E. Port 1 of device 1 is connected to port 1 of device 2 via link A. Port 2 of device 2 is connected to port 1 of device 3 via link B. Port 2 of device 3 is connected to port 1 of device 5 via link C. Port 2 of device 5 is connected to port 2 of device 4 via link D. Port 3 of device 4 is connected to port 1 of device 6 via link E. In addition, although not labeled with letters for the links, port 3 of device 2 is connected via a link to port 1 of device 4 and port 3 of device 5 is connected via a link to port 1 of device 7.

Each device receiving an cell must receive and process each cell based on several fields in the cell, including the address in the DA field. The address in the DA field indicates whether the cell should be routed using explicit routing or destination address routing. According to an embodiment of the present invention, the address in DA is provided by the relay function 208 (FIG. 2) of the switch to the forwarding database 202 (FIG. 2), which returns a corresponding port number. If the address in DA is the permissive address (or the address of the device), then the forwarding database 202 returns the port number corresponding to the switch manager 204, and the switch manager 204 then performs explicit route processing (see the pseudo-code described above or FIG. 3 for a description of explicit route processing). According to explicit route processing, switch manager 204 explicitly forwards or routes the cell based on the list of ports in IPATH( ) for outbound cells or based on RPath( ) for inbound cells if the cell has not reached the end of the explicit route. Otherwise, if the address does not match the permissive address or the address of the device, the relay function forwards the cell using destination address routing. In example 1, there is an end-to-end explicit route, so each device along the route performs explicit route processing.

Example 1

With reference to FIG. 4, in example 1, device 1 wishes to send a cell to device 6. Furthermore, it is assumed in this example that the cell is to be explicitly routed from device 1 through devices 2, 3, 5 and 4 to device 6 (end-to-end explicit routing). This is the explicit route that the cell will follow through the network. Table 1 (given below) lists the contents of the directed route fields on each of the labeled links for an outbound cell, and table 2 (given below) lists the contents of the directed route fields on each of the labeled links for an inbound cell following the return path (RPATH) as generated in table 1. The use of the phrase p/n (e.g., p/1, p/3) in the tables indicates that the permissive address is used if the specific address is unknown.

TABLE 1

Outbound End-to-End Explicit Route

| Link | DA | SA | Direction | Hop Count | Hop Pointer | DMAC | SMAC | IPATH( ) | RPATH( ) |
|------|----|----|-----------|-----------|-------------|------|------|----------|----------|
| A    | p  | p/1 | 0 | 5 | 1 | p/6 | p/1 | 1,2,2,2,3 | 0,0,0,0,0 |
| B    | p  | p/2 | 0 | 5 | 2 | p/6 | P/1 | 1,2,2,2,3 | 1,0,0,0,0 |
| C    | p  | p/3 | 0 | 5 | 3 | p/6 | p/1 | 1,2,2,2,3 | 1,1,0,0,0 |
| D    | p  | p/5 | 0 | 5 | 4 | p/6 | p/1 | 1,2,2,2,3 | 1,1,1,0,0 |
| E    | p  | p/4 | 0 | 5 | 5 | p/6 | p/1 | 1,2,2,2,3 | 1,1,1,2,0 |
| (End) | p | p/6 | 0 | 5 | 5 | p/6 | p/1 | 1,2,2,2,3 | 1,1,1,2,1 |

Referring to table 1, device 1 initializes DA to the permissive address (p) and SA to its own address, 1 (p will be used for SA if no address has been assigned to device 1). The Hop Count is set to 5 because there are 5 hops (or links to transit) before reaching device 6, the final destination, and the Hop Pointer is initialized to 1. DMAC is initialized to 6 (address of final destination of cell) and SMAC is initialized to 1 (address of originating device of the cell). IPATH( ) is initialized to list the destination ports to be used for forwarding the cell through the network, and RPATH( ) is cleared to all zeros (and will be populated as the outbound cell transits the network).

At device 2, the relay function extracts the DA field from the cell and forwards it to the forwarding database 202 (FIG. 2), which returns a corresponding destination port. Because the DA field of the received cell contains the permissive address, the forwarding database 202 returns the port number assigned to the switch manager 204 (FIG. 2). At device 2, the switch manager 204 performs explicit route processing, first examining the Direction field (indicating outbound cell) and determining that the Hop Pointer=1 is less than Hop Count (thus, the cell has not reached the end of the explicit route). Each device examines the Hop Pointer and the Direction field in this manner. As a result, the switch manager performs the following: The switch manager 204 maintains DA as the permissive address, sets SA to 2 (the current device's address) and sets RPATH(Hop Pointer=1) to be 1 (the port on which device 2 received the cell). The Hop Pointer is incremented to 2. The cell is then output to port 2 of device 2 because IPath(Hop Pointer=2)=2.

The outbound cell is then transmitted over link B and is received at port 1 of device 3. Because DA is the permissive address, the switch manager 204 of device 3 performs explicit route processing, and sets SA to 3 (current device's address), and sets RPath(Hop Pointer=2)=1 (which is the port number of device 3 that received the cell), and increments Hop Pointer to 3. Because the cell has not yet reached the last device in the explicit route, the cell is output to port 2 of device 3, as specified by IPath(3).

In a similar manner, the cell is explicitly forwarded through device's 5, 4 and 6. When the cell reaches device 6, the Hop Pointer is equal to 5, which matches the Hop Count.

As a result, because the Direction=0 (outbound) and Hop Pointer is greater than or equal to Hop Count, this indicates that the cell has reached the end of the explicit path. Therefore, at Device 6, DA is set to the final destination address DMAC, SA is set to 6, and RPath(5) is set to 1 (the port at device 6 that received the cell). The Hop Pointer is not incremented. The switch manager 204 of device 6 then compares the final destination address DMAC to its own address. Because the DMAC field of the cell matches its own address (6), the cell has reached its final destination and is not forwarded.

Frequently, a device will need to return a cell (an inbound cell) in response to receiving one. Table 2 lists the contents of the directed route fields on each of the labeled links for an inbound cell following the return path (RPath).

TABLE 2

Inbound End-to-End Explicit Route

| Link | DA | SA | Direction | Hop Count | Hop Pointer | DMAC | SMAC | IPATH( ) | RPATH( ) |
|------|----|----|-----------|-----------|-------------|------|------|----------|----------|
| E    | p  | p   | 1 | 5 | 5 | p/6 | p/1 | 1,2,2,2,3 | 1,1,1,2,1 |
| D    | p  | p/4 | 1 | 5 | 4 | p/6 | p/1 | 1,2,2,2,3 | 1,1,1,2,1 |
| C    | p  | p/5 | 1 | 5 | 3 | p/6 | p/1 | 1,2,2,2,3 | 1,1,1,2,1 |
| B    | p  | p/3 | 1 | 5 | 2 | p/6 | p/1 | 1,2,2,2,3 | 1,1,1,2,1 |
| A    | p  | p/2 | 1 | 5 | 1 | p/6 | p/1 | 1,2,2,2,3 | 1,1,1,2,1 |

As shown in table 2, at device 6, SA and DA of the return cell are both set to the permissive address. DA is set to the permissive address because the last portion of the directed route of the initial cell is an explicit path. Hop Pointer of the return cell is set at 5 (its last state in the initial cell). The Direction of the return cell is set to 1 (inbound cell), and the Hop Count is also set at 5. The cell is then sent out the port of device 6 from which the cell was received (port number 1). The cell is received at device 4, and the switch manager performs explicit route processing because the DA field matches permissive address.

The explicit route processing is performed at each device by examining the direction field and determining if the cell has reached the end of the explicit route. The return cell has reached the end of the explicit route if the Hop Pointer is equal to zero. If the cell has not reached the end of the explicit route, the Hop Pointer is decremented and the cell is forwarded along the explicit path designated by RPath( ). If the Hop Pointer is equal to zero, then this device is the last device in the explicit path and the device compares its own address to the address in SMAC (which indicates the final destination address for inbound or return cells). If the device's own address matches the address in SMAC, the cell has reached its final destination and is not forwarded.

Example 2

In this example, it is assumed that the cell is to be routed using destination address routing from device 1 to device 5, then forwarded using explicit routing from device 5 to device 6. It is further assumed that the forwarding database 202 of device 2 is loaded such that cells destined to device 5 are forwarded through port 2 of device 2. Table 3 illustrates the outbound case and table 4 illustrates the inbound case.

TABLE 3

Outbound Destination to Explicit Route

| Link | DA | SA | Direction | Hop Count | Hop Pointer | DMAC | SMAC | IPATH( ) | RPATH( ) |
|------|-----|-----|-----------|-----------|-------------|------|------|----------|----------|
| A | 5 | 1 | 0 | 2 | 0 | p/6 | 1 | 2,3 | 0,0 |
| B | 5 | 1 | 0 | 2 | 0 | p/6 | 1 | 2,3 | 0,0 |
| C | 5 | 1 | 0 | 2 | 0 | p/6 | 1 | 2,3 | 0,0 |
| D | p | p/5 | 0 | 2 | 1 | p/6 | 1 | 2,3 | 0,0 |
| E | p | p/4 | 0 | 2 | 2 | p/6 | 1 | 2,3 | 2,0 |

The directed route illustrated in table 3 includes a destination address routing for links A, B and C, followed by explicit routing for links D and E. Referring to table 3, before sending the initial cell over link A, device 1 sets DA to 5 because the cell is destination address routed (based on forwarding databases) from device 1 to device 5. SA is set to 1, and the direction is set to 0 (outbound). There are only two hops in the explicit route portion of the directed route. Thus, Hop Count is set to 2. IPATH( ) is initialized with the list of ports for the explicit path, but is not used during the destination address routing portion of the directed route.

When the cell is received at device 2 over link A, the cell is stored in a Rx queue 230 (FIG. 2). The relay function 208 extracts or copies the DA field (5) and forwards this address to the forwarding database 202. The forwarding database 202 returns the number of the destination port (2) corresponding to this destination address (5). The cell is transferred to a Tx queue in the switch or device. The relay function 208 then routes the cell to link B via port 2. Hop Pointer, SA, DA and RPATH( ) remain unchanged during this destination address routing portion of the directed route.

Device 3 similarly examines the DA field and then forwards the cell to link C via the specified port (port 2). Alternatively, the cell could have taken a different path, through devices 1, 2, 4 and 5 if the forwarding database for device 2 specified port 3 instead for cells destined to device 5.

When the cell is received at device 5 it is stored in a Rx queue and the relay function 208 sends a copy of the address in the DA field to the forwarding database 202. Because the address in the DA field is the address of device 5 (the address of the switch manager 204 of the device), the forwarding database returns a port number corresponding to the switch manager 204. The cell is then stored in memory 206. The switch manager 204 then performs explicit route processing on the cell. The switch manager sets DA to the permissive address, sets SA to 5. RPath(Hop Pointer=0) is not set because Hop Pointer is less than 1. The switch manager then increments the Hop Pointer to 1 and then forwards the cell out to port indicated by IPath(Hop Pointer=1), which is port number 2 of device 5.

The cell is received at port 2 of device 4. Device 4 performs similar explicit route processing because the cell is provided to the switch manager based on the permissive address in the DA field. RPATH(1) is set to 2, Hop Pointer is incremented to 2, and the cell is sent to the port identified by IPATH(2), which is port 3 of device 4.

When the outbound cell is received by device 6, it is forwarded to the switch manager (based on the permissive address in the DA field). When the cell is received by the switch manager 204, the manager 204 compares the Hop Pointer to the Hop Count. In this case, the Hop Pointer is equal to the Hop Count, which is 2. This indicates that the cell has reached the end of the explicit route. SA and DA are initialized and RPath(2) is set to 1. The Switch manager 204 of device 6 then compares the address in the DMAC field to the device's own address (6). Because these match, the cell has reached its final destination and is not forwarded.

In a similar manner, table 4 illustrates the inbound case. Referring to table 4, the return (inbound) cell is explicitly routed over links E and D using RPATH( ), and is destination routed over links C, B and A.

TABLE 4

Inbound Destination to Explicit Route

| Link | DA | SA | Direction | Hop Count | Hop Pointer | DMAC | SMAC | IPATH( ) | RPATH( ) |
|------|-----|-----|-----------|-----------|-------------|------|------|----------|----------|
| E | p | p/6 | 1 | 2 | 2 | p/6 | 1 | 2,3 | 2,1 |
| D | p | p/4 | 1 | 2 | 1 | p/6 | 1 | 2,3 | 2,1 |
| C | 1 | 5 | 1 | 2 | 0 | p/6 | 1 | 2,3 | 2,1 |
| B | 1 | 5 | 1 | 2 | 0 | p/6 | 1 | 2,3 | 2,1 |
| A | 1 | 5 | 1 | 2 | 0 | p/6 | 1 | 2,3 | 2,1 |

Example 3

Example 3 is illustrated in tables 5 and 6, shown below. In this example, it is assumed that the cell is to be explicitly routed from device 1 through devices 2, 3 and 5. From device 5, the cell is destination address routed to device 6. For a return cell, the cell is destination address from device 6 to device 5 via links E and D, and is explicitly routed from device 5 through devices 3, 2 and 1. The operation of example 3 is similar to the examples described above.

TABLE 5

Outbound Explicit Route to Destination Address Route

| Link | DA | SA  | Direction | Hop Count | Hop Pointer | DMAC | SMAC | IPATH( ) | RPATH( ) |
|------|----|-----|-----------|-----------|-------------|------|------|----------|----------|
| A    | p  | p/1 | 0         | 3         | 1           | 6    | p/1  | 1,2,2    | 0,0,0    |
| B    | p  | p/2 | 0         | 3         | 2           | 6    | p/1  | 1,2,2    | 1,0,0    |
| C    | p  | p/3 | 0         | 3         | 3           | 6    | p/1  | 1,2,2    | 1,1,0    |
| D    | 6  | 5   | 0         | 3         | 4           | 6    | p/1  | 1,2,2    | 1,1,1    |
| E    | 6  | 5   | 0         | 3         | 4           | 6    | p/1  | 1,2,2    | 1,1,1    |

TABLE 6

Inbound Explicit Route to Destination Address Route

| Link | DA | SA  | Direction | Hop Count | Hop Pointer | DMAC | SMAC | IPATH( ) | RPATH( ) |
|------|----|-----|-----------|-----------|-------------|------|------|----------|----------|
| E    | 5  | 6   | 1         | 3         | 4           | 6    | p/1  | 1,2,2    | 1,1,1    |
| D    | 5  | 6   | 1         | 3         | 4           | 6    | p/1  | 1,2,2    | 1,1,1    |
| C    | p  | p/5 | 1         | 3         | 3           | 6    | p/1  | 1,2,2    | 1,1,1    |
| B    | p  | p/3 | 1         | 3         | 2           | 6    | p/1  | 1,2,2    | 1,1,1    |
| A    | p  | p/2 | 1         | 3         | 1           | 6    | p/1  | 1,2,2    | 1,1,1    |

Flowchart For Directed Routing

Figure 5:
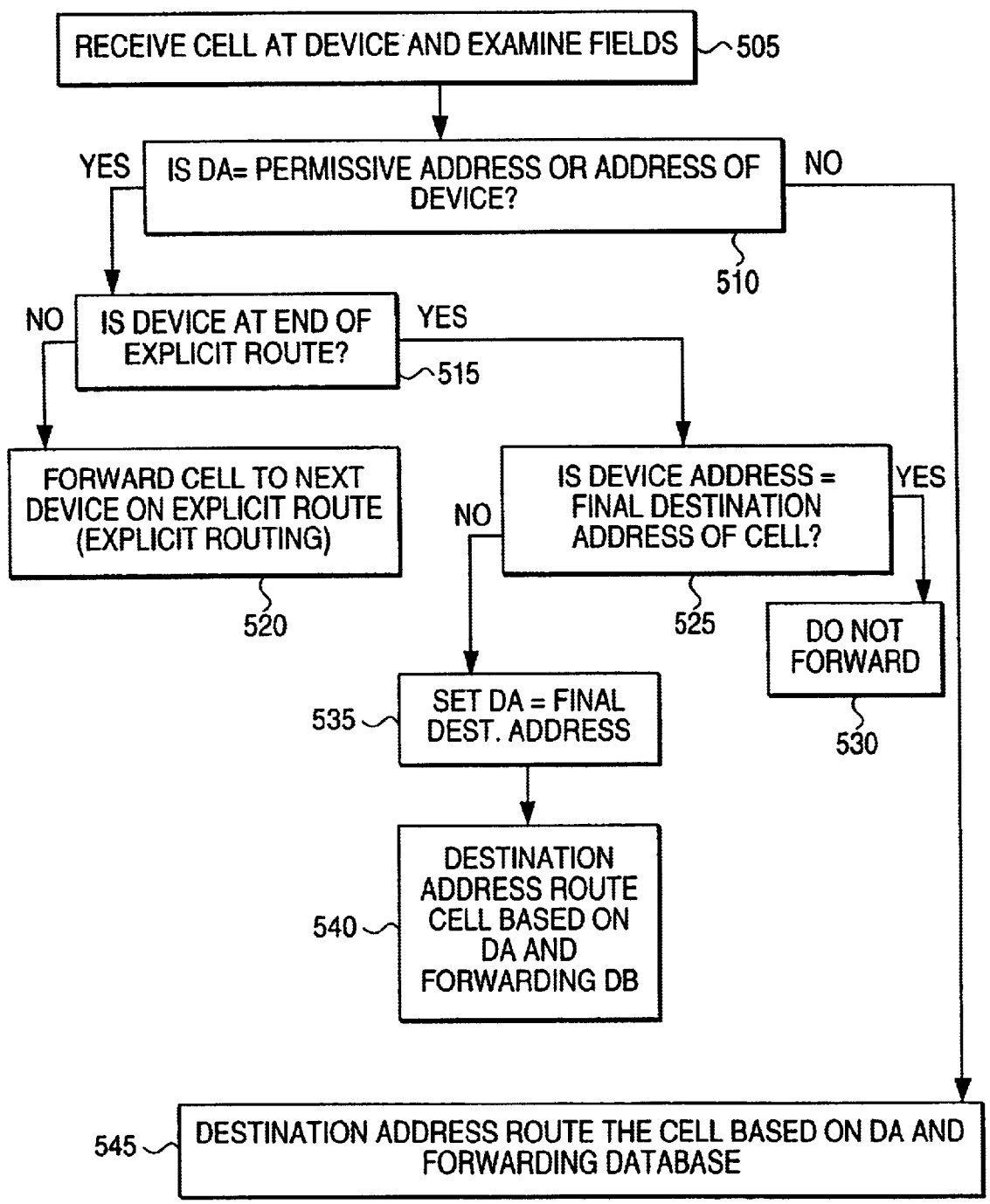
FIG. 5 is an example flowchart for cell processing at each device or switch according to an embodiment of the present invention.

FIG. 5 is a flowchart for the cell processing that occurs at each device or switch as the cell transits the network, according to an embodiment of the present invention. At step 505, the cell is received and the fields in the cell are examined.

At step 510, the switch determines if the address in the DA field is equal to either the permissive address or the address of the device itself. If not, the cell is destination address routed based on the address in the DA field and the device's forwarding database, step 545.

At step 510, if the address in the DA field is equal to either the permissive address or the address of the device itself, flow proceeds to step 515. At step 515, the device determines whether the cell is at the end of the explicit route. If the cell is not at the end of the explicit route, the cell is forwarded to the next device on the explicit route, step 520. The explicit route is specified by IPath( ) for outbound cells and by RPath( ) for inbound cells.

If the cell is at the end of the explicit route, at step 525 the device determines whether the device address is equal to the final destination address (e.g., DMAC for outbound cells, and SMAC for inbound cells). If the device address matches the final destination address, the cell has reached its finals destination and is not forwarded, step 530.

If the cell has not reached its final destination, the device sets the DA field to the final destination address, step 535, and then destination address routes the cell based on the DA field and the device's forwarding database, step 540.

Several embodiments of the present invention are specifically illustrated and/or described herein. However, it will be appreciated that modifications and variations of the present invention are covered by the above teachings and within the purview of the appended claims without departing from the spirit and intended scope of the invention. As used herein, the term "cell" is used to mean a collection of data that is transmitted as a single unit, and is not limited to an Asynchronous Transfer Mode (ATM) cell or the like. Rather the term "cell" encompasses any type of data unit, such as a packet, datagram, cell, etc. Also, while some of the addresses refer to Medium Access Control (MAC) addresses, such as DMAC and SMAC, it should be understood that any type of network addresses can be used, such as Internet Protocol (IP) addresses, ATM addresses, etc.

What is claimed is:

1. A method of routing a cell along a directed route comprising the steps of:

receiving the cell including a first address and a final destination address;

explicitly routing the cell if the first address is a predetermined global address or the address of a device; and destination address routing the cell based on the final destination address if the first address is not equal to the predetermined global address or the address of the device.

2. The method of claim 1, further comprising the step of providing a copy of the first address to a forwarding database to obtain routing instructions, the routing instructions identifying a destination port for sending the cell for destination address routing if the first address is not equal to the predetermined global address or the address of the device, the routing instructions identifying a management entity at the device for receiving and explicit route processing the cell if the first address is a predetermined global address or the address of the device.

3. The method of claim 1 wherein said received cell also includes information specifying an explicit route for the cell to traverse and a Hop Pointer identifying the position of the cell in the explicit route.

4. The method of claim 3 wherein said step of explicitly routing the cell comprises the steps of:

determining if the cell is at the end of the explicit route based on the hop pointer;

adjusting the hop pointer; and routing the cell to the next device in the explicit route if the cell is not at the end of the explicit route.

5. The method of claim 4 wherein said information specifying an explicit route for the cell comprises information identifying destination ports to be used for forwarding the cell along the explicit route.

6. The method of claim 5 wherein said step of routing the cell to the next device in the explicit route comprises the step of using the hop pointer to identify the appropriate destination port for routing the cell using the information identifying destination ports.

7. The method of claim 1 wherein said cell includes information identifying an explicit outbound path for an initial cell.

8. The method of claim 7 wherein information identifying an explicit inbound path for a return cell is populated by devices along the explicit outbound path of a corresponding initial cell.

9. A method of routing a cell along a directed route through a network, the directed route including a destination address route portion and an explicit route portion, the method comprising the steps of:
   receiving a cell at a device, the cell including a first address, a final destination address, and information specifying the explicit route portion;
   determining if the first address is equal to a predetermined global address or the address of the device;
   explicitly routing the cell to a next device of the explicit route portion if the first address is the predetermined global address or the address of the device and the device is not at the end of the explicit route portion; and
   destination address routing the cell based on the final destination address if the first address is not equal to the predetermined global address or the address of the device.

10. The method of claim 9 wherein said step of destination address routing comprises the step of destination address routing the cell based on the final destination address if the first address is not equal to the predetermined global address or the address of the device, or if cell is at the end of the explicit route portion.

11. The method of claim 9 wherein said cell is an initial cell.

12. The method of claim 9 wherein said cell is a cell sent as a return cell sent in reply to an initial cell that traverses a directed route including an explicit path, wherein the information describing the explicit route for the return cell is generated by devices along the explicit route portion of the initial cell, the explicit route portion for the return cell being a reverse path of the explicit route portion of the initial cell.

13. A device for routing cells in a network using either explicit routing or destination address routing, each cell including a first address and a final destination address, the device comprising:
   a plurality of ports, each port connected to a link;
   a receive queue and a transmit queue coupled to each port;
   a forwarding database storing cell routing information corresponding to each of a plurality of addresses;
   a relay entity coupled to the queues and the forwarding database, the relay entity obtaining routing information from the forwarding database based upon the first address and relaying the cell to the port specified by the routing information if the first address is not a global address or an address of the device;
   a management entity coupled to the relay entity, the relay entity relaying the cell to the management entity for explicit routing if the first address in the cell is a predetermined global address or the address of the device.

14. The device of claim 13 wherein the cell also includes information describing an explicit route for the cell and a final destination address, the management entity routing the cell to the next device in the explicit route if the cell has not reached the end of the explicit route.

15. The device of claim 14 wherein management entity comprises a switch manager.

16. The device of claim 13 wherein the relay entity copies the cell from a receive queue to a transmit queue corresponding to the port specified by the routing information if the first address is not a global address or an address of the device.

17. A device for routing cells in a network using either explicit routing or destination address routing, each cell including a first address and a final destination address, the device comprising:
   a relay entity obtaining routing information based upon the first address in the cell and destination address routing the cell if the first address is not a global address or an address of the device;
   a management entity coupled to the relay entity, the relay entity relaying the cell to the management entity for explicit route processing if the first address in the cell is a predetermined global address or the address of the device.

18. A device for routing cells in a network along a directed route including a destination address route portion and an explicit route portion, each cell including a first address and a final destination address and information specifying the explicit route portion, the device comprising:
   a relay entity obtaining routing information based upon the first address in the cell and destination address routing the cell if the first address is not a global address or an address of the device; and
   a management entity coupled to the relay entity, the management entity explicitly routing the cell to a next device of the explicit route portion if the first address is the predetermined global address or the address of the device and the device is not at the end of the explicit route portion, and the management entity destination address routing the cell based on the final destination address if the first address is not equal to the predetermined global address or the address of the device.

19. A computer program encoded on a computer readable medium for routing a cell, the computer program causing the following to be performed when executed by a computer:
   receiving the cell including a first address and a final destination address;
   explicitly routing the cell if the first address is a predetermined global address or the address of a device; and
   destination address routing the cell based on the final destination address if the first address is not equal to the predetermined global address or the address of the device.

20. In a data network comprising a plurality of interconnected nodes for routing data cells/packets along a directed route, each data cell/packet including a first address and a final destination address, each node comprising:
   a plurality of ports, each port connected to a link;
   a receive queue and a transmit queue coupled to each port;
   a forwarding database to store routing information corresponding to each of a plurality of addresses;
   a relay entity to obtain routing information from the forwarding database based upon the first address of an incoming data cell/packet, and relay the data cell/packet to the port specified by the routing information if the first address is not a predetermined global address or an address of the node; and
   a management entity to process explicit routing if the first address in the incoming data cell/packet is the predetermined global address or the address of the node.

21. The node as claimed in claim 20, wherein each data cell/packet further includes information describing an explicit route for the data cell/packet and a final destination address, the management entity routing the data cell/packet to a next node in the data network in the explicit route if the data cell/packet has not reached the end of the explicit route.

22. The node as claimed in claim 21, wherein the relay entity copies the data cell/packet from the receive queue to the transmit queue corresponding to the port specified by the routing information if the first address is not the predetermined global address or the address of the node.

23. The node as claimed in claim 20, wherein the data cell/packet further includes information specifying an explicit route for the data cell/packet to traverse and a hop pointer identifying the position of the data cell/packet in the explicit route.

24. The node as claimed in claim 23, wherein the explicit routing of the incoming data cell/packet is processed by:

determining if the data cell/packet is at the end of the explicit route based on the hop pointer;

adjusting the hop pointer; and routing the data cell/packet to a next node in the data network in the explicit route if the data cell/packet is not at the end of the explicit route.

25. The node as claimed in claim 24, wherein the information specifying an explicit route for the data cell/packet comprises information identifying destination ports to be used for forwarding the data cell/packet along the explicit route.

26. The node as claimed in claim 25, wherein the data cell/packet routed to the next node in the explicit route comprises using the hop pointer to identify the appropriate destination port for routing the data cell/packet using the information identifying destination ports.

* * * * *